: 2,792,423
Patented May 14, 1957

2,792,423

PRODUCTION OF BIS (PERFLUOROACYL) PEROXIDES

Donald M. Young and William N. Stoops, Charleston, W. Va., assignors to Union Carbide and Carbon Corporation, a corporation of New York No Drawing. Application May 17, 1951,
Serial No. 226,927

12 Claims. (Cl. 260—610)

This invention relates to a novel class of halogenated acyl peroxides; and more especially it concerns the production of novel bis(perfluoroacyl) peroxides of saturated aliphatic monocarboxylic acids, which are useful as catalysts for the polymerization of halogen-substituted ethylenes such as vinyl chloride, vinyl fluoride, and the vinylidene halides, such as the chloride and the fluoride.

The novel compounds of the invention are bis(perfluoroacyl) peroxides having structures corresponding to the general formula:

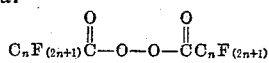

wherein $n$ designates an integer of from 2 to 10, and $C_nF_{(2n+1)}$ can be a primary, a secondary or a tertiary fluorine-substituted alkyl group. Among the peroxides of the invention are bis(pentafluoropropionyl) peroxide, bis(heptafluoroisobutyryl) peroxide, bis(heptafluorobutyryl) peroxide, bis(nonafluorovaleryl) peroxide, bis(hendecafluorocaproyl) peroxide, bis(pentadecafluorocaprylyl) peroxide, and bis(heneicosafluorohendecanoyl) peroxide. These compounds are commonly liquids at room temperature and rather sensitive to shock, but are relatively safe to handle in solution in suitable solvents. They produce free radicals at moderate temperatures owing to their instability at such temperatures. They are readily soluble in a variety of organic solvents, including ketones such as acetone, esters such as ethyl acetate, alcohols such as ethanol, ethers such as ethyl ether, and halogenated alkanes such as 1,1,2-trichloro-1,2,2-trifluoroethane and trichlorofluoromethane.

These novel bis(perfluoroacyl) peroxides have utility as oxidizing agents for many purposes; and they can be used as starting materials for the production of other compounds. They are especially efficacious as polymerization catalysts for the polymerization of various polymerizable unsaturated compounds such as halogen-substituted unsaturated hydrocarbons. Due to the sensitivity of these compounds to decomposition by shock, it is preferred, when using these bis(perfluoroacyl) peroxides as polymerization catalysts, to employ them in the form of dilute solutions thereof in solvents which are liquid under the polymerization conditions and which do not have a deleterious action on the course of the polymerization.

The bis(perfluoroacyl) peroxides of the invention can be prepared by vigorously agitating an aqueous solution of an alkali metal peroxide, such as sodium or potassium peroxide, at temperatures within the range between about —15° C. and 25° C., with a perfluoroacyl halide such as heptafluorobutyryl chloride or fluoride, dissolved in an organic water-immiscible solvent which also is a solvent for the bis(perfluoroacyl) peroxide, and is substantially inert to the reactants, to water, and to the product, e. g., alkyl ethers such as ethyl ether; benzene; ethylene dichloride; and fully halogen-substituted saturated hydrocarbons such as trichlorofluoromethane, dichlorodifluoromethane, 1,1,2 - trichloro - 1,2,2 - trifluoroethane, decafluorobutane, dodecafluoropentane, and octadecafluorooctane, and mixtures thereof. Octafluorotetrahydrofuran can be used. The fully halogen-substituted saturated hydrocarbons, such as those named, have specific gravities greater than 1, as shown in the "Handbook of Chemistry and Physics," 25th Ed. Preferably the water or aqueous solution is cooled to 0° C. or below, after which the alkali metal peroxide is added slowly, followed by the solvent or mixture of solvents. The temperature of the mixture then is reduced to from 0° to —15° C. and the perfluoroacyl halide is added rapidly with vigorous agitation during which time the temperature of the reaction mixture increases in an amount depending upon the quantity of the reactants and the efficacy of the cooling. Upon completion of the reaction the agitation is promptly discontinued, the mixture is allowed to stratify, and the organic solvent layer which contains the bis(perfluoroacyl) peroxide is separated from the aqueous layer and is stored at temperatures preferably around —15° C. or below because of the relatively fast rate of decomposition of the peroxide at higher temperatures. The bis(perfluoroacyl) peroxide can be recovered from this solution and purified by successive low temperature recrystallizations from the solvent, followed by drying at low temperatures under reduced pressure, as hereinafter disclosed.

The yield and degree of purity of the bis(perfluoroacyl) peroxide produced in the process are good. In view of the shock sensitivity and thermal instability of these peroxides, it is advantageous to store and to use the same in the form of a dilute solution thereof containing up to around 10 grams of the peroxide per 100 cc. of the solvent or solvent mixtures.

The perfluoroacyl halides used as starting materials can be produced from the corresponding acids in well-known manner, as by reacting such an acid with the corresponding phosphorous pentahalide.

Perfluoroacyl anhydrides can be used in place of the corresponding acid halides in the production of the bis(perfluoroacyl) peroxides of the invention, but the use of such anhydrides is economically less attractive.

The following examples will serve to illustrate the invention.

EXAMPLE 1

*Production of bis(heptafluorobutyryl) peroxide*

To 100 cc. of water cooled to 0° C. was slowly added 7.8 grams of sodium peroxide, followed by 250 cc. of a 60:40 by volume mixture of 1,1,2-trichloro-1,2,2-trifluoroethane and trichlorofluoromethane. The temperature of the mixture then was reduced to —5° C. and, with vigorous agitation, 23.3 grams of heptafluorobutyryl chloride was rapidly added. During a one minute reaction time the temperature rose to 5° C. The lower solvent layer then was separated from the aqueous layer and the former was cooled to —15° C. The product analyzed 7.2 grams of bis(heptafluorobutyryl) peroxide per 100 cc. of the solvent solution, representing a yield of 84.5%, based upon the heptafluorobutyryl chloride. After purification by four recrystallizations from trichlorofluoromethane at —80° C., followed by drying at —40° C. under an absolute pressure of 2 millimeters of mercury, the bis(heptafluorobutyryl) peroxide had a melting point of —15° C.; a boiling point of 19° C. under 6 millimeters of mercury pressure; an equivalent weight of 220 by peroxide analysis, and of 208 by saponification (theoretical 213); and a molecular weight by freezing-point depression of 437 (theoretical 426).

EXAMPLE 2

*Bis(pentafluoropropionyl) peroxide*

Following the general procedure described in Example 1, 27.3 grams of pentafluoropropionyl chloride was charged rapidly with vigorous agitation into a reactor containing 7.8 grams of sodium peroxide, 100 cc. of water, and 500 cc. of a 50:50 by volume mixture of 1,1,2-trichloro-1,2,2-trifluoroethane and trichlorofluoromethane. The temperature rose during the two minute reaction time from —5° C. to +4° C. After separating the solvent layer in the manner described in Example 1, the solvent solution was found to contain 4 grams of bis(pentafluoropropionyl) peroxide per 100 cc. of the solution, corresponding to a yield of 82%, based upon the pentafluoropropionyl chloride.

EXAMPLE 3

*Bis(hendecafluorocaproyl) peroxide*

Following the procedure described in Example 1, 12.5 grams of hendecafluorocaproyl chloride was reacted with 2.0 grams of sodium peroxide dissolved in 25 cc. of water, in contact with 200 cc. of the solvent mixture described in Example 2. During the reaction period of two minutes the reaction temperature increased from —1° C. to 4° C. After separating the solvent layer from the aqueous layer, the former was found to contain 4.1 grams of bis(hendecafluorocaproyl) peroxide per 100 cc. of the solvent solution, corresponding to a yield of 69.5%, based upon the hendecafluorocaproyl chloride.

These bis(perfluoroacyl) peroxides are effective catalysts for the polymerization of halogen-substituted ethylenes such as vinyl chloride, vinyl fluoride, and vinylidene chloride, alone or in admixture with each other or with other polymerizable compounds containing an ethylenic double bond, such as vinyl acetate, the lower alkyl esters of acrylic and methacrylic acids, and acrylonitrile. The polymerization of the monomer or mixture of monomers preferably is conducted at temperatures between around 0° C. and 50° C., although higher and lower temperatures can be used effectively. In such polymerizations, between around 0.01% and 0.2% or more of the catalyst commonly is used, being added to the monomer in the form of dilute solutions of the peroxide containing around 1 to 10 grams per 100 cc. of the organic solvent, usually a completely halogenated alkane such as those herein disclosed.

The following examples illustrate the polymerization of vinyl compounds using the compounds of this invention as polymerization catalysts. In these examples, all parts are given in terms of weight unless otherwise indicated.

EXAMPLE 4

A chilled glass container was charged with 25 parts of liquid vinyl chloride and 0.025 part of bis(heptafluorobutyryl) peroxide (the latter being added as a solution containing 2.5 grams per 100 cc. of a mixture of equal volumes of 1,1,2-trichloro-1,2,2-trifluoroethane and trichlorofluoromethane). The container was flushed with nitrogen, sealed, and placed in a water bath held at 25° C. After two hours the container was chilled in Dry Ice, opened, and the polymer was dried overnight at 60° C. and weighed. A conversion of 20.8% of the monomer to polyvinyl chloride having a reduced viscosity of 1.8 was secured.

EXAMPLE 5

Following the general procedure described in Example 4, a mixture of 40 parts of vinylidene chloride and 0.040 part of bis(heptafluorobutyryl) peroxide gave, after 1.75 hours at 25° C., and 8.0% conversion of the monomer to polyvinylidene chloride.

The invention is susceptible of modification within the scope of the appended claims.

I claim:

1. A bis(perfluoroalkanoyl) peroxide having at least three carbon atoms in each alkanoyl group.

2. A fluorinated acyl peroxide having the formula

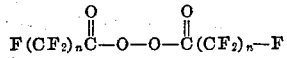

wherein *n* is an integer of at least 2.

3. A bis(perfluoroalkanoyl) peroxide having from three to eleven carbon atoms in each alkanoyl group.

4. Bis(pentafluoropropionyl) peroxide.

5. Bis(heptafluorobutyryl) peroxide.

6. Bis(nonafluorovaleryl) peroxide.

7. Bis(hendecafluorocaproyl) peroxide.

8. Process for producing a bis(perfluoroalkanoyl) peroxide, which comprises rapidly and intimately intermixing and reacting during a period of not substantially more than 2 minutes a perfluoroalkanoyl halide and an aqueous solution of an alkali metal peroxide, in the presence as solvent of a completely halogen-substituted alkane having only chlorine and fluorine as substituents and having at least one fluorine atom attached to each carbon atom, said perfluoroalkanoyl halide and said alkali metal peroxide being rapidly mixed in the ratio of from substantially 1 mole to 2 moles of the perfluoroalkanoyl halide per mole of the alkali metal peroxide, while maintaining the reaction temperature within the range between around —15° C. and +25° C., and promptly separating and recovering from the resulting reaction mixture a solution of the bis(perfluoroalkanoyl) peroxide thus produced in said halogen-substituted alkane.

9. Process for producing a bis(perfluoroalkanoyl) peroxide, which comprises rapidly and intimately intermixing with agitation and reacting during a period of not substantially more than two minutes a perfluoroalkanoyl halide and an aqueous solution of an alkali metal peroxide, in the presence as solvent of a completely halogen-substituted alkane having only chlorine and fluorine as substitutents and having at least one fluorine atom attached to each carbon atom, said perfluoroalkanoyl halide and said alkali metal peroxide being in the ratio of from substantially one mole to two moles of the perfluoroalkanoyl halide per mole of the alkali metal peroxide, while maintaining the reaction temperature within the range between about —15° C. and +25° C., thereafter discontinuing the agitation whereupon solution of the bis(perfluoroalkanoyl) peroxide in the said completely halogen-substituted alkane promptly separates from the aqueous phase as a lower solvent phase, and separating and recovering the latter as a solution of the bis(perfluoroalkanoyl) peroxide thus produced in said halogen-substituted alkane.

10. Process for producing a bis(perfluoroalkanoyl) peroxide, which comprises rapidly and intimately intermixing during a period of not substantially more than two minutes at temperatures maintained within the range between around —15° C. and 25° C. a perfluoroalkanoyl halide, an aqueous solution of an alkali metal peroxide, and a water-immiscible organic solvent for the said halide which is substantially inert to the said halide and said peroxide and is a solvent for the bis(perfluoroalkanoyl) peroxide reaction product thus formed, said perfluoroalkanoyl halide and said alkali metal peroxide being mixed and reacted in the ratio of substantially 1 mol to 2 mols of the said halide per mol of the said peroxide, said organic solvent being at least one completely halogen-substituted alkane having only chlorine and fluorine as substituents, promptly thereafter discontinuing the intermixing whereupon the reaction mixture promptly stratifies into an upper aqueous layer and a lower organic solvent layer containing the bis(perfluoroalkanoyl) peroxide, and isolating and recovering the last-named layer.

11. Process for producing a bis(perfluoroalkanoyl) peroxide, which comprises rapidly and intimately intermixing during a period of not substantially more than two minutes at temperatures maintained within the range between around —15° C. and 25° C. a perfluoroalkanoyl halide, an aqueous solution of an alkali metal peroxide, and a water-immiscible organic solvent for the said halide which is substantially inert to the said halide and said peroxide and is a solvent for the bis(perfluoroalkanoyl)

peroxide reaction product thus formed, said perfluoroalkanoyl halide and said alkali metal peroxide being mixed and reacted in the ratio of substantially 1 mol to 2 mols of the said halide per mol of the said peroxide, said organic solvent being at least one completely fluorine-substituted alkane, promptly thereafter discontinuing the intermixing whereupon the reaction mixture promptly stratifies into an upper aqueous layer and a lower organic solvent layer containing the bis(perfluoroalkanoyl) peroxide, and isolating and recovering the last-named layer.

12. Process for producing a bis(perfluoroalkanoyl) peroxide, which comprises rapidly mixing and reacting during a period of not substantially more than two minutes, at temperatures between around —15° C. and +25° C. a perfluoroalkanoyl halide having at least 3 carbon atoms in the molecule and an aqueous solution of an alkali metal peroxide, said halide and alkali metal peroxide being mixed in the ratio of from substantially 1 mol to 2 mols of said halide per mol of said peroxide, in the presence of a water-insoluble completely halogen-substituted alkane selected from the class consisting of 1,1,2-trichloro-1,2,2-trifluoroethane, trichlorofluoromethane, dichlorodifluoromethane, and mixtures thereof, immediately thereafter discontinuing the mixing and separating the solvent layer which promptly forms from the residual aqueous layer, and recovering said solvent layer composed of a solution of the bis(perfluoroalkanoyl) peroxide in the halogen-substituted alkane.

References Cited in the file of this patent

UNITED STATES PATENTS

| | | |
|---|---|---|
| 2,559,630 | Bullitt | July 10, 1951 |
| 2,580,358 | Miller et al. | Dec. 25, 1951 |
| 2,626,254 | Miller et al. | Jan. 20, 1953 |